Patented June 16, 1942

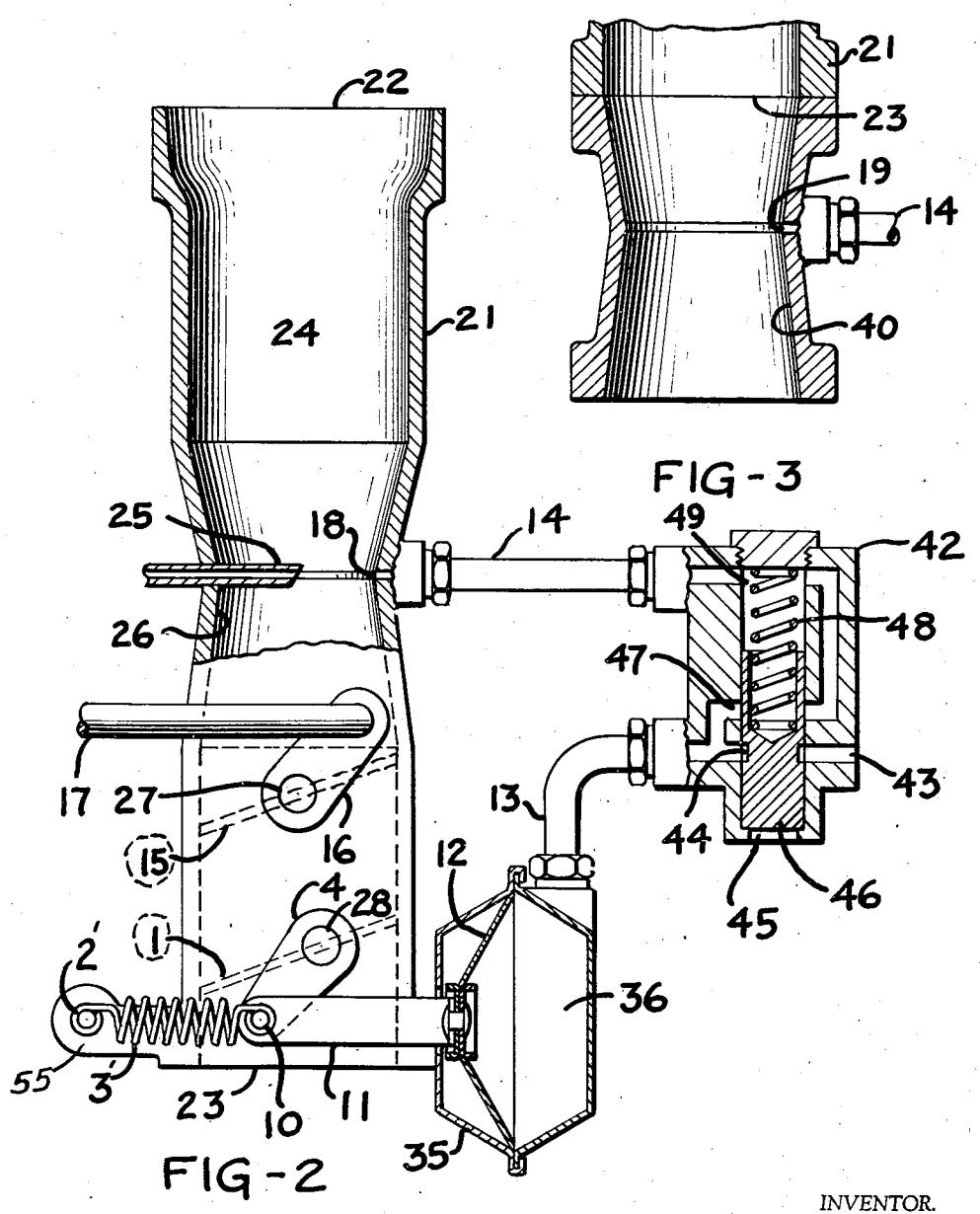

2,286,294

UNITED STATES PATENT OFFICE 2,286,294

CARBURETOR AND CHARGE CONTROL SYSTEM FOR INTERNAL COMBUSTION ENGINES

Marion Mallory, Detroit, Mich.

Application October 28, 1940, Serial No. 363,134

11 Claims. (Cl. 123—123)

This invention relates to a carburetor and charge control system for an internal combustion engine.

It is well known that the higher the compression of the fuel mixture at the time of combustion, the greater the power that is developed by the combustion. Thus, the trend in internal combustion engines is toward higher compression ratios. In the so-called high speed, high compression internal combustion engines, the intake passageway, that is, the passageway through the carburetor and intake manifold, is fixed in cross sectional area. The cross sectional area of the intake passageway is usually designed sufficiently large so as to give low resistance to the fuel-air mixture to flow into the cylinders at high speed to maintain a high compression. Thus, with an intake passageway having low resistance to maintain high compression at high speed, the low resistance will permit too much charge to flow into the engine cylinders when the throttle is fairly or fully wide open at low engine speeds. Consequently, the compression will be too high, causing detonation.

If, on the other hand, the intake passageway is sufficiently small so that knocking will not occur at low engine speeds, then at high speeds an insufficient charge will be drawn into the combustion chamber to give the high compression necessary to obtain the best power and fuel economy.

I have found that even if the engine does have extremely high compression it will take the full charge, that is, operate at the maximum high compression in the combustion chamber without detonation when a certain critical speed is reached. In other words, it is not necessary to restrict the intake passageway, that is, restrict the breathing of the engine, over the complete range of speed. The critical speed at which the engine can operate at full charge or maximum compression without detonation will vary with different types of engines. For example, with an engine having a high compression if the engine's top speed or R. P. M. is about 3800, restriction of the intake passageway or breathing of the engine should be eliminated when the engine reaches a speed of about 2500 R. P. M. In the case of an engine having a high but relatively lower compression than the engine referred to above, the restriction in the intake passageway might be fully eliminated at an engine speed of, say, 2000 R. P. M. without detonation. Then again, where the compression is still higher than the engine first referred to and the top speed is 3800 R. P. M., it may be necessary to restrict the intake passageway until the engine reaches a speed of 3000 R. P. M. in order to prevent detonation. In other words, I have found that it is essential to efficient engine operation to restrict the intake passageway at low engine speeds and gradually remove the restriction until the engine speed or R. P. M. reaches a critical speed where, when the restriction is completely removed, detonation will not occur at that speed and higher engine speeds.

It is the object of this invention to overcome the above described defects. This object is achieved by controlling the size or resistance of the intake passageway so that its cross-sectional area or resistance to the flow of charge is regulated in such a manner that the charge is restricted at low engine speeds when the throttle is fairly wide open or wide open and the restriction in the intake passageway is gradually removed, permitting more and more charge to flow as the speed of the engine increases, and then completely removed when the engine reaches a critical speed where a full charge, i. e., maximum compression in the combustion chamber, will not cause detonation. This object is achieved by an auxiliary throttle valve in the intake passageway which is controlled at slow speeds by the vacuum in the intake manifold and at higher engine speeds by either a centrifugal governor or a suction device operated by the vacuum created by the air flowing through the venturi.

In the drawings:

Fig. 2 is a view similar to Fig. 1 showing the unbalanced auxiliary throttle valve controlled by a suction device connected into the carburetor venturi.

Fig. 3 is a fragmentary detail showing the suction device optionally connected into a venturi positioned in the intake manifold.

Figure 1:
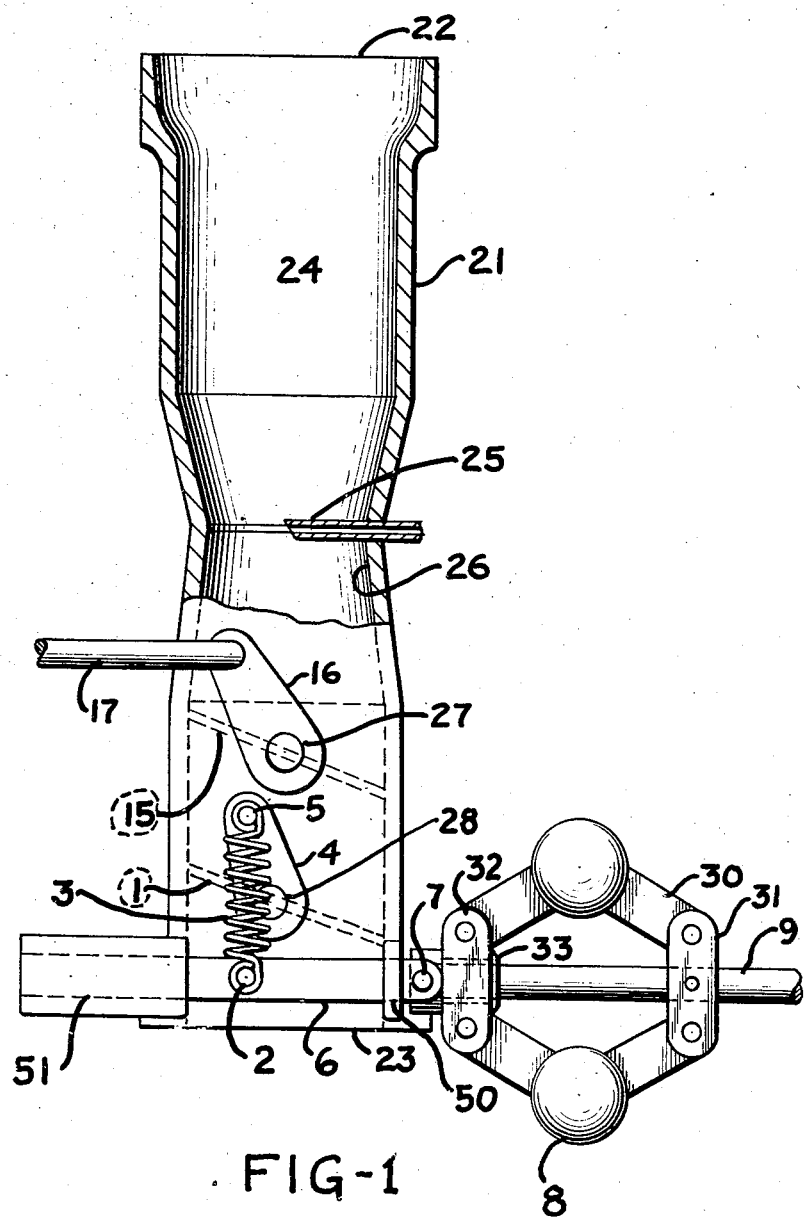
Fig. 1 is a vertical section through the carburetor showing the manually controlled throttle valve and the auxiliary unbalanced throttle valve with the centrifugal governor.

Referring more particularly to the drawings, there is shown a carburetor comprising a housing 21 with an air inlet 22 and a fuel air mixture charge outlet 23 into the manifold. The carburetor intake passageway 24 is provided with a conventional fuel nozzle 25 positioned in the carburetor venturi 26.

The manually controlled throttle valve 15 is mounted on shaft 27 journalled in the carburetor housing 21. Lever 16 is fixed on the shaft 27 and is connected to the manually operated push and pull throttle rod 17. Thus, the throttle 15 is opened and closed in the conventional manner by pushing or pulling on rod 17 which is connected with the conventional foot operated accelerator pedal or manually operated throttle lever (not shown).

The unbalanced auxiliary valve 1 is fixed on shaft 28 journalled in housing 21. Lever 4 is fixed on shaft 28. Valve 1 is normally biased toward closed position by the tension spring 3. One end of the tension coil spring 3 is fixed to pin 2 on rod 6 and the other end is fixed to pin 5 on the lever 4.

A centrifugal governor is mounted on rotary shaft 9 which is connected to and run off of the cam shaft or any other suitable rotating part of the engine (not shown). The centrifugal governor comprises the usual links 30 pivotally connected at one end to bracket 31 fixed on shaft 9 and pivotally connected at the other end to bracket 32 fixed on collar 33 which is slidably mounted on shaft 9. A rod 6 is pivotally connected to collar 33 by pin 7. Rod 6 is slidably mounted on the housing 21 and guided in supports 50 and 51 fixed on housing 21. The centrifugal weights or balls are designated 8.

The operation of the device is as follows: Spring 3 is an over center type of spring, that is, when spring 3 is positioned to the left of shaft 28 it tends to hold the unbalanced valve 1 closed. As shown in Fig. 1, spring 3 holds valve 1 practically closed for engine idling. The throttle valve 15 is operated in the conventional manner to control the speed of the engine. However, the charge entering the engine cylinders is controlled by the automatically operated auxiliary valve 1. As throttle valve 15 is opened, the pressure above unbalanced valve 1 will rise thereby causing the valve to open further against the tension of spring 3 and admit more charge into the engine. The speed of the engine will increase commensurately and the centrifugal governor will expand thereby drawing bar 6 toward the right to assist the manifold vacuum to open valve 1. When the speed of the engine has increased to the critical speed at which a full charge can be admitted into the combustion chambers without detonation, spring 3 will pass over center or to the right of shaft 28 thereby contracting and abruptly opening valve 1 to fully opened position and remove the restriction in intake passageway 24.

Assuming that the throttle valve 15 is opened wide when the engine or car speed is low, the vacuum under valve 1 would tend to open the valve and thereby stretch the spring 3 and expand the centrifugal governor. Then as the speed of the engine picks up, the governor will expand very rapidly and will be fully expanded before the engine reaches its maximum R. P. M. Of course, the compression of the engine and other factors determine the critical speed at which the governor should be completely expanded and thereby completely open the auxiliary valve 1. The centrifugal governor is shown by way of example rather than by way of limitation as one of several means by which the restriction can be speedily removed above a critical speed and by means of which the restriction of the intake passageway can be speedily effected when the engine speed drops below this critical speed. It is evident that as the speed of the engine decreases, as soon as the spring 3 passes to the left of center, the spring 3 will again contract and tend to close valve 1 to restrict the intake passageway.

The primary or initial opening of the auxiliary valve is effected by utilizing the suction or vacuum in the intake manifold. The means for utilizing the suction or vacuum in the intake manifold for effecting the primary opening of the valve 1, as shown herein for purposes of description and not by way of limitation, comprises unbalancing the valve 1 so that the unequal pressures acting on the valve on opposite sides of the shaft 28 will tend to open the same. It is also evident from the above that the secondary opening of the valve as the engine reaches the critical speed is effected by means controlled by the speed of the engine and that this secondary opening is preferably much more rapid than the direct opening.

The centrifugal governor is merely an example of one of numerous means for effecting the secondary opening rapidly when the critical speed is reached. Other means than the centrifugal governor for effecting the secondary opening of the auxiliary valve 1 after it reaches the said critical speed is shown in Fig. 2. In the modified form of the invention shown in Fig. 2, a suction device operated off the venturi is substituted for the centrifugal governor. The suction device comprises a housing 35 provided with a conventional flexible diaphragm 12. An arm 11 is fixed at one end to the diaphragm 12 and at the other end is pivoted to lever 4 by pin 10. Chamber 36 in the suction device is closed to atmosphere except through conduit 13, valve 42, and conduit 14 which place chamber 36 in communication with venturi 26 through orifice 18 when the critical engine speed is reached. The air flowing through venturi 26 past orifice 18 produces a vacuum in conduit 14 and chamber 49. This vacuum created will vary directly with the speed of the gas flowing through venturi 26.

A valve is inserted between conduits 13 and 14. The valve comprises a housing 42 having a passageway 47 which communicates at one end with conduit 14 and at the other end with conduit 13. A reciprocating valve 46 backed up by compression spring 48 is mounted in cylindrical opening 49 within the housing 42. This valve at low engine speed closes passageway 47 to thereby shut off conduit 14 from suction chamber 36. At higher engine speeds the vacuum created in chamber 49 causes valve 46 to rise in the chamber until the circumferential groove 44 in valve 46 reaches passageway 47 thereby placing the chamber 36 in communication with venturi 26 by means of conduit 13, passageway 47, conduit 14 and orifice 18. When conduit 47 is shut off, then the chamber 36 communicates with the atmosphere through conduit 13, circumferential groove 44 and outlet 43. When piston 46 is down, as shown, thereby shutting off passageway 47, chamber 36 will be open to atmosphere to prevent compression in the chamber. Spring 3' is mounted by securing one end on pin 10 and the other end on pin 2'. Pin 2' is fixed on lug 55 of the housing 21.

The operation of the modified form of the invention is as follows: Spring 3' will keep the unbalanced valve closed to idle the engine. As throttle 15 is gradually opened, the manifold vacuum or suction acting on unbalanced valve 1 will gradually open valve 1. At lower engine speeds the Venturi suction, that is, the vacuum created in conduit 14 and chamber 49 by the air flowing by orifice 18, is not high enough to lift piston or valve 46. Thus, the suction in the manifold acting on unbalanced valve 1 must oppose spring 3' until the engine speed gets high enough so that the suction in the venturi will lift piston 46 to place the venturi in communication with chamber 36. This occurs at the predetermined critical speed and at this point the valve 1 will open very rapidly to remove the restriction from the passageway 24.

If desired, air bleed 43 and spring 3' may be omitted. This will make chamber 36, when valve 46 is down, a compression chamber which opposes the suction tending to open valve 1 at low engine speeds. In this form of the invention when the speed of the engine is high enough to take the full charge, the Venturi vacuum will lift piston 46 thereby placing chamber 36 in communication with the venturi to release its pressure in chamber 37. As soon as the chamber 36 is placed in communication with the venturi, valve 1 will be swung wide open.

The modified form shown in Fig. 3 is identical with the modified form shown in Fig. 2 except that the suction device does not operate off of the carburetor venturi but is connected by means of conduit 14 with orifice 19 in venturi 40 positioned in the intake passageway on the engine side of throttle valve 1. Whether the venturi is on the atmosphere side or the engine side of either of the throttle valves 1 and 15 is immaterial. In this modified form of the invention the auxiliary valve operates in the same manner as the valve shown in Fig. 2.

From the above it will be seen that two factors are used to control the charge in the intake passageway. The first of these factors is the pressure or vacuum existing in the intake manifold on the engine side of the auxiliary valve and the other factor is the speed of the engine. As herein shown by way of description but not limitation, the means which utilizes the manifold vacuum or pressure happens to be identical with the auxiliary throttle, that is, the auxiliary throttle is unbalanced so that it will function both as an auxiliary throttle and will respond or be actuated by the pressure or vacuum in the intake manifold. There are numerous ways of controlling the auxiliary valve in accordance with the speed of the engine as herein exemplified by the speed governor and the Venturi suction device.

I claim:

1. A carburetion and charge control system for an internal combustion engine comprising an intake passageway, a manually controlled throttle valve in said intake passageway, an unbalanced throttle valve in said passageway tending to open when subjected to intake manifold suction, and means responding to engine speed connected to said unbalanced valve tending to open the same as the speed of the engine increases whereby said unbalanced throttle valve is controlled in accordance with the speed and load of the engine.

2. A carburetion and charge control system for an internal combustion engine comprising an intake passageway, a manually controlled throttle valve in said intake passageway, an unbalanced throttle valve in said intake passageway tending to open when subjected to intake passageway suction, and means responding to engine speed connected to said unbalanced valve tending to open the same as the speed of the engine increases and to close the same as the engine speed decreases whereby when the manually controlled throttle valve is thrown wide open at lower engine speeds the unbalanced valve responds to intake manifold suction to let in sufficient charge thereby acting against the said means responding to engine speed and at higher engine speeds the said means responds to engine speed and opens the unbalanced valve in accordance with engine speed.

3. A carburetion and charge control system for an internal combustion engine comprising an intake passageway, a manually controlled throttle valve in said passageway, an unbalanced throttle valve in said passageway, a centrifugal governor responsive to engine speed connected to said unbalanced throttle valve whereby the opening and closing of the unbalanced throttle valve is controlled in accordance with the speed and load of the said engine.

4. A carburetion and charge control system for an internal combustion engine comprising an intake passageway having a venturi, a manually controlled throttle valve in said intake passageway, an unbalanced throttle valve in said intake passageway tending to open when subjected to intake manifold suction, a suction device connected to said unbalanced throttle valve, means connecting said suction device into the venturi whereby the suction device responds to the vacuum created by the flow of air through the venturi tending to open the unbalanced valve as the engine speed increases and to close the valve as the engine speed decreases whereby the said unbalanced valve is controlled in accordance with the speed and load of the said engine.

5. A carburetion and charge control system for an internal combustion engine comprising an intake passageway for charging the cylinder, a charge control valve in said passageway by which the charge to said engine passes, means in communication with the intake passageway on the engine side of the charge control valve and responding to the pressure existing in said intake passageway between the valve and engine to control the valve in accordance with the varying loads of the engine, and additional means connected to said valve for controlling the valve in relation to the engine speed.

6. In a charge control system for an internal combustion engine, an intake passageway for charging the cylinder, a manually controlled throttle valve in said intake passageway, an auxiliary throttle valve in said passageway on the engine side of the manually controlled throttle valve, the charge to the engine passing by said auxiliary valve, said auxiliary valve responding to an increase in pressure in the intake passageway to close the auxiliary valve and to a decrease in pressure in the intake passageway to open the valve, means also connected to said auxiliary throttle valve responding to an increase in engine speed to open the auxiliary valve and to a decrease in engine speed to close the auxiliary valve whereby the auxiliary valve particularly at lower engine speeds modifies the operation of the speed responsive means and at higher engine speeds the speed responsive means modifies the action of the auxiliary valve so that the auxiliary valve is controlled in accordance with the speed of the engine and the load of the engine and regulates the charge accordingly.

7. A carburetion and charge control system for an internal combustion engine comprising an intake passageway for charging the cylinder, a charge control valve in said passageway by which the charge to said engine passes, said charge control valve responding to the pressure existing in said intake passageway between the said valve and engine to control the valve in accordance with the varying loads of the engine below a predetermined critical speed, and additional means connected to said valve for fully opening the valve at a predetermined critical engine speed at which the engine will operate at full charge without detonation.

8. A carburetion and charge control system for an internal combustion engine comprising an intake passageway for charging the engine cylinders, charge control means in said passageway by which the charge to said engine passes for restricting said passageway, the said charge control means responding to the pressure existing in said intake passageway between the charge control means and the engine for controlling the charge control means in accordance with the varying loads of the engine whereby upon a decrease of said pressure the charge control means decreases the restriction in the intake passageway and upon an increase of the said pressure the said charge control means increases the restriction in the intake passageway, and other means connected to the said charge control means for controlling the charge control means in relation to the engine speed whereby at and above a critical engine speed the charge control means ceases to restrict the intake passageway and a full charge is delivered to the engine cylinders.

9. In a charge control system for an internal combustion engine, an intake passageway for charging the cylinder, a manually controlled throttle valve in said intake passageway, an auxiliary throttle valve in said passageway on the engine side of the manually controlled throttle valve, the entire charge to the engine passing by said auxiliary valve, the said auxiliary valve responding to an increase in the pressure in the intake passageway to close the auxiliary valve and to a decrease in the pressure in the intake passageway to open the valve, and means also connected to said auxiliary throttle valve responding to an increase in engine speed to fully open the valve when the engine reaches a predetermined critical speed at which a full charge can be delivered to the engine and the engine operated without detonation.

10. In a charge control system for an internal combustion engine, an intake passageway for charging the cylinder, a manually controlled throttle valve in said intake passageway, an auxiliary throttle valve in said passageway on the engine side of the manually controlled throttle valve, the entire charge to the engine passing by said auxiliary valve, the said auxiliary valve responding to an increase in the pressure in the intake passageway to close the auxiliary valve and to a decrease in the pressure in the intake passageway to open the valve, and a centrifugal governor controlled by the speed of the engine also connected to said auxiliary valve for fully opening the same at a predetermined critical speed less than the top speed of the engine at which the engine will operate at full charge without detonation.

11. In a charge control system for an internal combustion engine, an intake passageway including a venturi for charging the cylinder, a manually controlled throttle valve in said intake passageway, an auxiliary throttle valve in said passageway on the engine side of the manually controlled throttle valve, the entire charge to the engine passing by said auxiliary valve, the said auxiliary valve responding to an increase in the pressure in the intake passageway to close the auxiliary valve and to a decrease in the pressure in the intake passageway to open the valve, and suction means connected to said auxiliary throttle valve and communicating with the venturi above a predetermined critical speed whereby the suction means responds to the vacuum created by the air flowing through the venturi to fully open said valve above a critical speed at which the engine will operate at full charge without detonation.

MARION MALLORY.